INVENTOR

David Theodore Nelson Williamson

BY

Cameron, Kerkam & Sutton

ATTORNEYS

Sept. 30, 1958 D. T. N. WILLIAMSON 2,854,529

GRAMOPHONE PICK-UP HEADS

Filed March 16, 1955 2 Sheets-Sheet 2

INVENTOR.
David Theodore Nelson Williamson
BY
Cameron, Kerkam & Sutton
ATTORNEYS 2,854,529

GRAMOPHONE PICK-UP HEADS

David T. N. Williamson, Edinburgh, Scotland, assignor to Ferranti Limited, Hollinwood, Lancashire, England, a company of Great Britain Application March 16, 1955, Serial No. 494,705

Claims priority, application Great Britain March 18, 1954

13 Claims. (Cl. 179—100.41)

This invention relates to gramaphone pick-up heads of the moving-conductor type for reproducing from plane circular discs played in any position.

An object of the invention is to provide a gramaphone pick-up of this type which is of improved construction as regards the pick-up head.

In accordance with the present invention, a gramophone pick-up head for reproducing from a plane circular disc includes an approximately V-shaped conductive member having rigid arms, mounting means for supporting said member normal to the disc from the ends of said member with the angular point of the V towards the disc, said mounting means being torsionally resilient with respect to an axis parallel to the disc through the ends of said member for allowing vibration of said member about said axis, said member being so disposed in the pick-up head that the direction of said vibration is approximately normal to the sound track, said axis being sufficiently inclined to the pivotal plane for tracking purposes, a magnetic system for establishing for each of said arms a constant magnetic field enveloping that arm, the direction of the field being inclined to the arm and to the direction of vibration of the arm and being such that the voltages set up in said arms by such vibration assist one another, a pick-up stylus secured rigidly to said angular point to extend therefrom towards the disc, and electrical conductive means for deriving from the ends of the conductive member the voltage generated therein by such vibration.

By "pivotal plane" is meant the plane containing the pivotal axis of the pick-up arm (which axis is of course parallel to the axis of rotation of the disc and hence normal to the disc) and the mean position of the point of the stylus.

Figure 1:
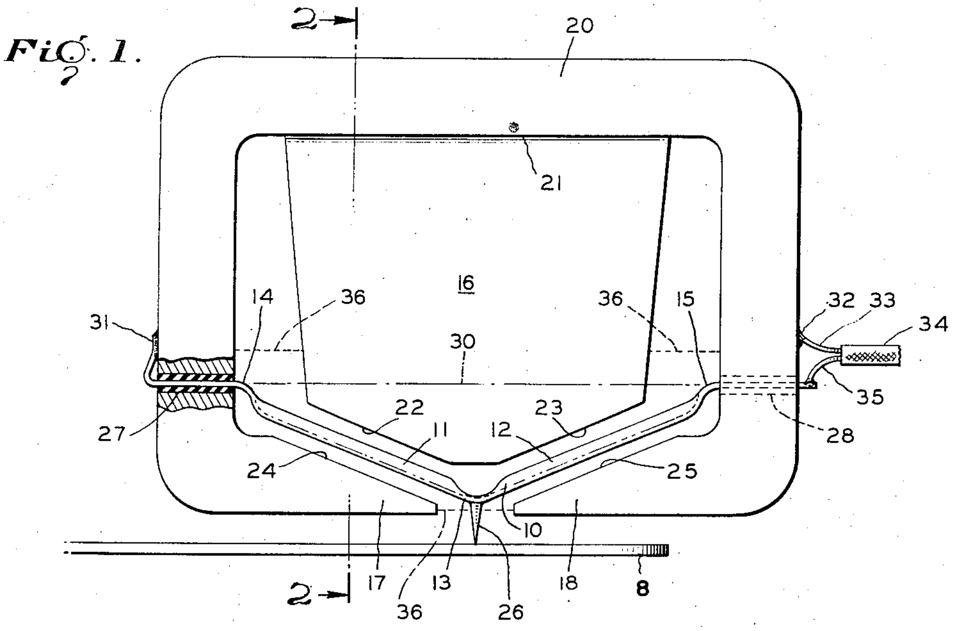
Figure 3:
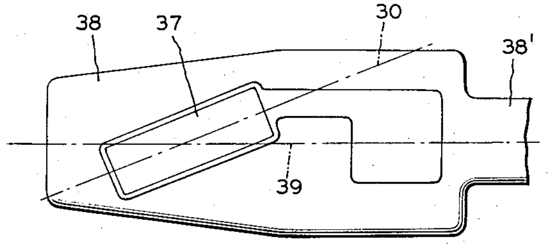
Figure 2:
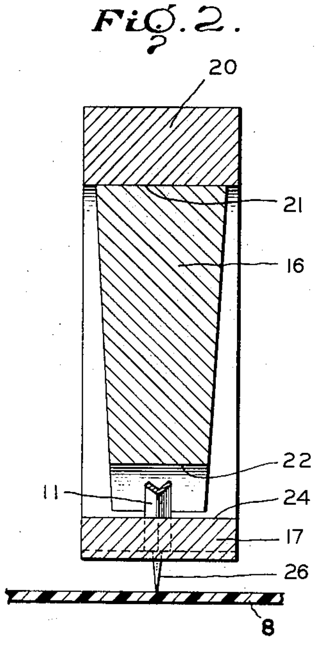
Figure 4:
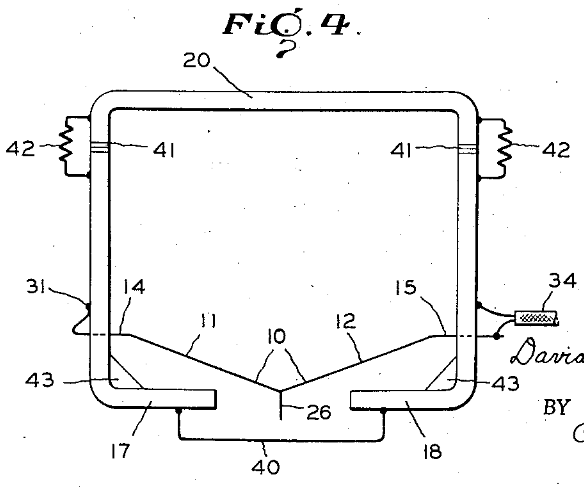
Figure 5:
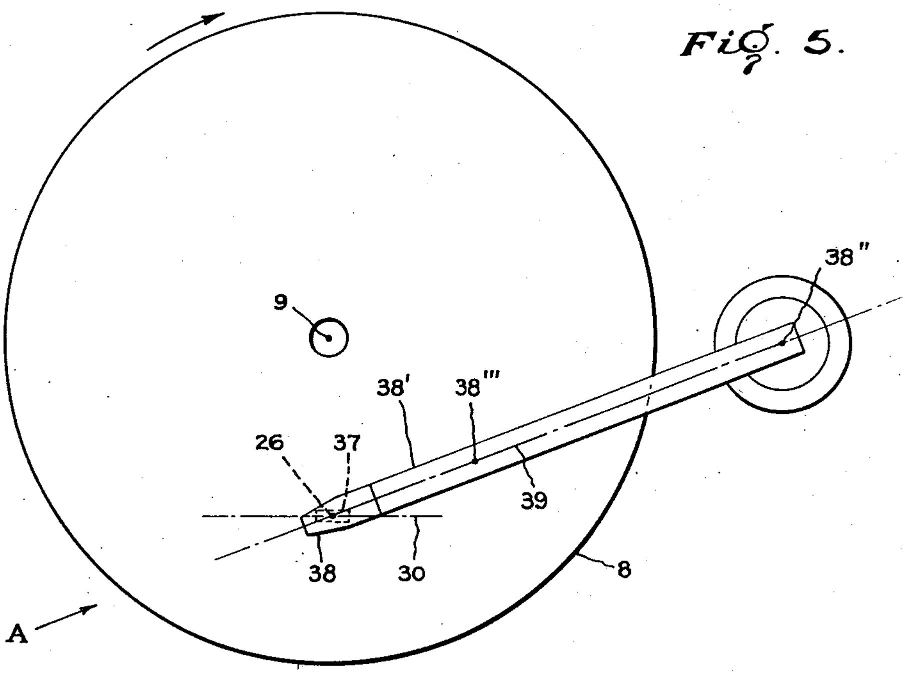
Figure 6:
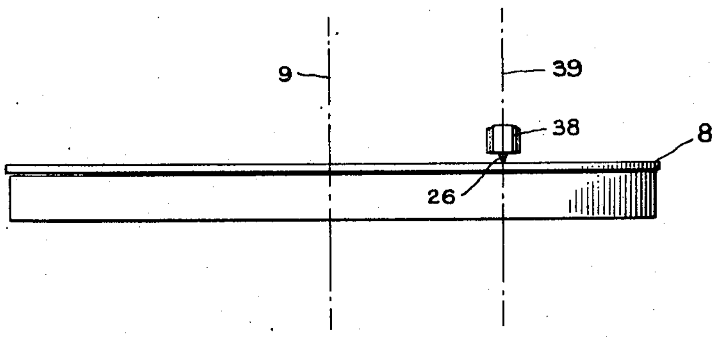

In the accompanying drawings,

Figure 1 shows in elevation to an enlarged scale a part of a pick-up head in accordance with the invention, Figure 2 is a sectional view taken on the line 2, 2 of Figure 1, Figure 3 is a bottom plan view to a reduced scale of a pick-up head containing the part shown in Figures 1 and 2, Figure 4 is a schematic diagram to illustrate a modified form of the invention, Figure 5 is a top plan view in outline of the pick-up head and supporting arm of Figure 3 showing the relationship between the pivotal axis and pivotal plane of said arm, the vibration axis of the conductive member of the pick-up head, and the axis of rotation of the disc, and Figure 6 is an end elevation of the elements shown in Figure 5, looking in the direction of arrow A in Figure 5.

In carrying out the invention according to one form by way of example, see Figs. 1 and 2, a pick-up head of the moving-conductor type to reproduce from a gramophone disc 8 played horizontally by rotation about its axis 9 includes a conductive member 10 in the form of a broad V (see particularly Fig. 1) having straight arms 11 and 12. Member 10 is formed from a strip or ribbon of cadmium copper which over the length of arms 11 and 12 is bent so as to have a channel section as shown in Fig. 2, thereby imparting rigidity to the arms. At the angular point 13 of the V—that is to say, at the point of the V where the two arms meet—the member retains the ribbon form to allow it to be bent into V shape. The ends of member 10—that is, the free ends of arms 11 and 12—are continued in horizontal ribbon form as shown at 14 and 15 respectively to act as mounting means for member 10 in the manner to be described. Member 10 may be formed from the ribbon in a single pressing operation.

Member 10 is located normal to the disc 8, that is to say upright (with point 13 downwards) with each arm enveloped in a constant magnetic field. These fields are set up between a permanent magnet 16 and the ends 17 and 18 of an incomplete vertical rectangular loop 20 of mild steel surrounding member 10, to the inside upper surface 21 of a central part of which loop magnet 16 is cemented. One of the poles of magnet 16 is at the end thus secured to loop 20. The other end of the magnet, at which end the other pole is located, is within arms 11 and 12 and is provided with plane faces 22 and 23 in parallel with them respectively. The ends 17 and 18 of loop 20 are provided with inner plane faces 24 and 25 in parallel co-operation with the magnet faces 22 and 23 respectively. Through the gap between these ends of the loop the pick-up stylus 26 protrudes towards the disc, that is to say downwardly, from point 13 of member 10, to which the stylus is secured. The magnetic system thus consists of two magnetic circuits in parallel, the poles of one circuit being constituted by faces 22 and 24 and the poles of the other circuit by faces 23 and 25. Between these pairs of faces are established the fields which envelop arms 11 and 12.

The horizontal ribbon extensions 14 and 15 are insulated and secured within slots 27 and 28 cut across the vertical limbs of the loop 20 of the magnetic system. The centre lines of extensions 14 and 15 are collinear and the imaginary horizontal line 30 joining them constitutes the vibration axis of member 10. Extensions 14 and 15 are torsionally resilient with respect to this axis.

Extension 14 from arm 11, which it is assumed is the arm that is further from the pivot of the pick-up arm, is soldered to the outside of loop 20 at 31, adjacent to where the ribbon emerges from slot 27. From the opposite limb of loop 20 a connection is made at 32 between the loop and one lead 33 of a twin conductor 34 the other lead 35 of which is connected to extension 15 of arm 12. Conductor 34 conveys the signal derived from the pick-up.

The spaces surrounding arms 11 and 12 in the magnetic fields are filled with a rubber-like material in physical contact with the arms to damp out resonance without preventing the desired vibration of member 10 about axis 30. This material is omitted from the drawings for clarity but the external surfaces are indicated in Fig. 1 by the broken lines 36.

The combination of the magnet system and conductive member is mounted at 37 in the pick-up head 38 as shown in Fig. 3 (the pick-up arm being indicated at 38') in such manner that the direction of vibration of the stylus is approximately normal to the sound track, axis 30 being sufficiently inclined to the pivotal plane 39 (which is of course normal to the plane of the paper) for tracking purposes. As previously described and illustrated in Figs. 5 and 6, the pivotal plane 39 is defined by the pivotal axis 38'' of pick-up arms 38' and the mean position of the point of stylus 26, the pivotal axis 38″ being parallel to the rotational axis 9 of disc 8.

To reduce to a minimum the mass of the pick-up head, the magnet system is made as small as possible and the external structure 38 of the pick-up head consists of a moulded plastic case. Dynamic forces on the stylus due to motion of the pick-up as a whole about the pivotal axis 38″ are therefore small. The design is such that the centre of gravity 38‴ (Fig. 5) of the combination of the pick-up head and supporting arm 38′ lies in the pivotal plane 39, thus relieving conductive member 10 of any torque to which the weight of the pick-up would otherwise subject it.

The stylus is secured direct to member 10 to minimize the inertia of the vibrating system.

It will be apparent from the above description that the direction of each field is normal to the arm 11 or 12 within it and to the direction of vibration of the arm, the latter direction being normal to the plane of the paper. It will also be apparent that the voltages induced in the two arms by such vibration assist one another. The maximum response of the pick-up to the vibrations induced by the sound-track of the gramophone disc is thus assured. The total voltage set up between the ends of member 10 is applied to the leads in conductor 34, the upper part of loop 20 serving as the connection between extension 14 and lead 33.

Where it is found that nearby A. C. magnetic fields couple into the electric loop which includes the upper part of magnetic loop 20 sufficiently to induce an audible hum into the derived signal, a counteracting voltage may be set up as shown in Fig. 4, where those components that have already been described are indicated by the same references.

A second electric loop is formed by joining the two ends 17 and 18 of loop 20 with non-magnetic electrically conductive material 40; this second electric loop is therefore formed between the lower part of loop 20 and conductive member 10, and the voltage induced in member 10 is clearly of opposite sense to that induced in by the same A. C. field in the electric loop first mentioned. For complete counteraction the two electric loops should enclose the same area. Where this is not a practicable arrangement the electrical resistance of the larger electrical loop—in this case the electrical loop which includes the upper part of loop 20—may be increased, for example by introducing thin laminae 41 (see Fig. 4) of non-conductive material across a part of loop 20 included in that electrical loop and bridging the electrical gaps thus formed by resistors 42 of suitable value. The small airgaps introduced by the presence of the laminae are insignificant in comparison with the main airgaps and so do not increase the reluctance of the magnetic circuits appreciably.

An alternative method of securing sufficient counteraction to eliminate hum is to equalize the magnetic induction through the unequal areas of the two electric loops. This may be done by introducing ferromagnetic material of high permeability into the area of the smaller loop, as indicated at 43 in Fig. 4, so as to increase the flux (normal to the plane of the paper) through this loop due to the interfering field. Such material should be located so as not to reduce the flux in the magnetic fields supplied for member 10.

A further alternative is to make the connection to lead 33 from extension 14 direct instead of by way of the upper part of loop 20, thereby considerably reducing any electric loop into which interfering fields may couple.

Various details of the above-described arrangement may be modified within the scope of the invention. The gramophone discs need not be played horizontally; e. g. they may be played vertically or at a slope. Where a disc is not played horizontally the pivotal plane and the plane of the V cease to be vertical whilst remaining normal to the plane of the disc. The conductive member need not be formed from metallic ribbon; where it is so formed the army may be given sufficient rigidity by shaping the ribbon into other section than channel sections. The arms of the V need not be straight but may be slightly bent in the plane of the V. Member 10 may be formed by two conductors joined at the angular point of the V, instead of by one conductor (bent at the angular point) as described above. The fields need not be directed exactly normal to the arms and to the directions of vibration (though this of course is necessary if maximum output is required) as long as the fields are to some extent inclined to the arms and to those directions.

Some of the special advantages of a pick-up head in accordance with the invention are as follows: (1) The conductive member 10 is easily formed by simple press tooling. (2) As the magnetic fields do not extend appreciably outside the magnetic structure there is no tendency for stray flux to be shunted by any ferromagnetic material, such as parts of the turntable, under the pick-up. ((3) The triangular construction of member 10 gives it considerable rigidity to resist undesired motion without restricting the desired vibration about the horizontal axis 30. On the other hand the rigidity resulting from this construction is not great enough to resist impulsive vertical movements of the stylus sufficiently for the stylus to be damaged. Any desired degree of vertical compliance may be provided by a suitable choice of angle at the point 13 of the V. (4) Any vertical vibration of member 10 takes place in the direction of the field rather than across it and so does not give rise to an output voltage; for this reason also, any steady-state vertical displacement of the sylus due to the weight of the pick-up and any low-frequency vertical oscillation due to, say, a warped disc do not carry the arms of member 10 out of the field, as they may tend to do where the field is horizontal, and so do not affect the sensitivity.

What I claim is:

1. A gramophone pick-up head for reproducing sound from the sound track of a plane circular disc including a supporting arm pivoted for movement about an axis normal to the disc, an approximately V-shaped conductive member having rigid arms, mounting means for supporting said member in a plane normal to the disc from the ends of said member with the angular point of the V towards the disc, said mounting means being torsionally resilient with respect to an axis parallel to the disc through the ends of said member for allowing vibration of said member about said axis, a pick-up stylus secured rigidly to said angular point to extend therefrom towards the disc, said member being so disposed in the pick-up head that the direction of said vibration is approximately normal to the sound track of the disc and said vibration axis is inclined to the pivotal plane containing the pivotal axis of said supporting arm and the mean position of the point of said stylus, a magnetic system for establishing for each of said arms a constant magnetic field enveloping that arm, the direction of the field being inclined to the arm and to the direction of vibration of the arm and being such that the voltages set up in said arms by such vibration assist one another, and electrical conductive means for deriving from the ends of the conductive member the voltage generated therein by such vibration.

2. A gramophone pick-up head as claimed in claim 1 wherein said conductive member comprises a metallic ribbon having a channel shaped cross section over the length of each of said arms to impart rigidity to the arm.

3. A gramophone pick-up head as claimed in claim 2 wherein said mounting means at each end of said member is a continuation in ribbon form of said member.

4. A gramophone pick-up head as claimed in claim 3 wherein said magnetic system includes an incomplete loop of magnetic material surrounding said conductive member and having a gap through which the stylus protrudes, a permanent magnet secured by one pole to a central part of said loop and having at the other pole two pole-faces for co-operating respectively with two pole-faces one at each end of said loop to establish said fields.

5. A gramophone pick-up head as claimed in claim 4 wherein the direction of each of said fields is normal to the rigid arm of said conductive member enveloped by that field and to the direction of vibration of that arm.

6. A gramophone pick-up head as claimed in claim 5 wherein each rigid arm of said conductive member is surrounded by and in physical contact with resilient material for damping out resonances of the arm.

7. A gramophone pick-up head as claimed in claim 6 wherein the centre of gravity of the combination of the pick-up head and supporting arm lies in the pivotal plane containing the pivotal axis of said arm and the mean position of the point of said stylus.

8. A gramophone pick-up head as claimed in claim 1 wherein said magnetic system includes an incomplete loop of magnetic material surrounding said conductive member and having a gap through which the stylus protrudes, a permanent magnet secured by one pole to a central part of said loop and having at the other pole two pole-faces for co-operating respectively with two pole-faces one at each end of said loop to establish said fields.

9. A gramophone pick-up head as claimed in claim 8 wherein said electric conductive means includes as part of the electrical connection to one end of said conductive member a part of said loop of magnetic material.

10. A gramophone pick-up head as claimed in claim 9 wherein said conductive member and a portion of the loop of magnetic material intermediate the ends thereof form a first electrical loop and the ends of the loop of magnetic material are electrically connected together to form with said conductive member a second electrical loop for deriving from nearby alternating magnetic fields a voltage to counteract the voltage set up by those fields in said first electrical loop.

11. A gramophone pick-up head as claimed in claim 10 including means for increasing the electrical resistance of whichever of said electrical loops encloses the larger area.

12. A gramophone pick-up head as claimed in claim 11 including means for increasing the electrical resistance of a part of said loop of magnetic material comprising a narrow non-conductive gap in said loop and a resistor electrically bridging said gap.

13. A gramophone pick-up head as claimed in claim 10 wherein whichever of said electrical loops encloses the smaller area includes magnetic material to increase the flux of said alternating field enclosed by that electrical loop.

References Cited in the file of this patent

UNITED STATES PATENTS

| | | |
|---|---|---|
| 1,228,639 | Bayer | June 5, 1917 |
| 1,631,646 | Rice | June 7, 1927 |
| 1,960,007 | Harrison | May 22, 1934 |
| 2,379,782 | Bobb | July 3, 1945 |
| 2,383,994 | Smith | Sept. 4, 1945 |